United States Patent [19]

Cremona et al.

[11] Patent Number: 4,477,518

[45] Date of Patent: Oct. 16, 1984

[54] COATED PAPERS AND CARDBOARDS AND PROCESS FOR THEIR MANUFACTURE

[76] Inventors: Sauveur Cremona, 4 rue Terechkova, 33130 Begles; Joel Pijselman, 22 rue Andre Gide, 33400 Talence, both of France

[21] Appl. No.: 307,182

[22] Filed: Sep. 30, 1981

[30] Foreign Application Priority Data

Oct. 8, 1980 [FR] France ................................ 80 21464

[51] Int. Cl.[3] ......................... B32B 23/06; B32B 27/10

[52] U.S. Cl. ................................. 428/327; 428/313.5; 428/332; 428/342; 428/511; 428/514; 428/537

[58] Field of Search ................ 252/316; 428/342, 511, 428/537, 327, 305.5, 313.5, 514, 332

[56] References Cited

U.S. PATENT DOCUMENTS 3,816,169 6/1974 Vassiliades et al. ............ 252/316 X

FOREIGN PATENT DOCUMENTS 2,395,141 4/1980 France .
2016375 9/1979 United Kingdom .

OTHER PUBLICATIONS

English Translation of French Pat. No. 2,395,141 Identified as S-6476, 12 pages.
Haekh's Chemical Dictionary, 4th Ed., McGraw Hill Book Co. of New York, 1967, p. 410.

*Primary Examiner*—Thomas J. Herbert
*Attorney, Agent, or Firm*—Pennie & Edmonds

[57] ABSTRACT

Coated papers and cardboards comprising at least one compressible layer of coating containing hollow microspheres filled with a gas that is inert with respect to the microsphere-forming material. The coated papers and cardboards of this invention are used particularly for rotogravure printing. A process for manufacturing these coated papers and cardboards.

17 Claims, No Drawings

COATED PAPERS AND CARDBOARDS AND PROCESS FOR THEIR MANUFACTURE

TECHNICAL FIELD

This invention relates to novel papers and cardboards having a cellulose fiber base covered with at least one compressible coating layer that improves their mechanical properties and facilitates rotogravure printing on their surfaces.

This invention also relates to a process for manufacturing the unique coated papers and cardboards disclosed herein.

BACKGROUND ART

Coated papers or cardboards known in the art usually exhibit at least one coating layer containing pigments and binders. The most commonly used pigment is a clay such as kaolin, which is often associated with other pigments such as calcium carbonate, titanium oxide, hydrargillite, talc or barium sulfate. These pigments are usually fixed to the paper or cardboard with one or a mixture of the following binders: a styrene butadiene copolymer, an acrylic polymer, a vinyl acetate polymer, natural binders, starch, proteins, caseins, or polyvinyl alcohols.

The coating layer may also include dispersing agents such as tetrasodium pyrophosphate, sodium hexametaphosphate or low molecular weight polyacrylates, present in proportions of between 0.2 and 0.5% by weight in relation to the pigments. Agents such as carboxymethylcellulose and alginates, which are used to improve water retention properties, may also be present in the coating layer.

The requisite properties of a given coated paper or cardboard differ according to the printing method which is to be used: rotogravure, offset, letterpress, flexograph, silkscreening, etc. In the rotogravure process, ink is contained in small wells and its transfer by capillarity can occur only if the periphery of each well is in precise contact with the coated paper or cardboard onto which it is to be transferred. Because of this, a high smoothness coated paper or cardboard must be used. The higher the calendering pressure, the higher the smoothness obtained. However, in order to maintain a layer porosity sufficient for insuring the printing quality of the coated paper or, in the case of cardboard, to maintain physical or mechanical properties such as thickness and/or rigidity, the calendering pressure must be limited. Alternatively, a heavy-weight paper or cardboard—10 to 20% greater in weight—must be used. Due to these limitations, coated papers or cardboards known in the art, such as those coated with compounds containing mineral pigments, are generally not suitable for rotogravure printing.

GENERAL DESCRIPTION OF THE INVENTION

This invention discloses novel coated papers and cardboards that are particularly suitable for rotogravure printing while having good mechanical properties without excessive weight. According to the invention, the paper or cardboard has at least one layer of coating comprising hollow microspheres filled with an inert gas. The microspheres advantageously permit flexibility and compressibility that is far superior to that of standard coatings containing mineral pigments. The improved flexibility facilitates continuous contact between the coated paper or cardboard and the ink-containing wells of the rotogravure printing apparatus and eliminates the necessity of high smoothness coated paper or cardboard.

This invention also discloses a process for the manufacture of the coated paper and cardboard described herein.

DETAILED DESCRIPTION OF THE INVENTION

The compressible coating layer of the paper or cardboard of this invention can be an external layer. In this case, however, the surface of the coated paper or cardboard exhibits a high coefficient of friction which can hinder sliding of the coated sheets during transformation operations. Further, the absorption of inks and glaze is important because it can alter the freshness and gloss of the printing.

For these reasons, the coating layer containing the microspheres advantageously comprises an undercoat covered with an outside film that improves surface properties of the paper or cardboard, such as, sliding and gloss. This outside film is a conventional layer, for example, a coating layer with a sole base of mineral pigments, a film of an organic polymer that may be charged with pigments, or a film of an extruded organic polymer. Preferably, this outside layer is very thin so that it will not affect the improved flexibility provided by the microsphere-containing coating layer.

The microspheres comprising the compressible layer are, for example, hollow microcapsules with flexible walls consisting of a polymer that can be softened by heating, such as polyvinylidene chloride, polystyrene, or a copolymer with an acrylonitrile and vinylidene chloride base, and containing gas which is inert with respect to the microshpere-forming material, such as isobutane, a a chlorinated or chlorofluorinated hydrocarbon derivative or carbon dioxide gas on the inside. The compressible coating layer containing the microspheres has a calculated average thickness of between 2 and 50 μm or more.

In one embodiment of this invention, the compressible coating layer comprises between 1 and 100% by weight of the above-described gas filled microspheres and between 99 and 0% by weight of one or more pigments. It is preferred to use between 25 and 100% by weight of the gas filled microspheres and 75 to 0% by weight of the pigments. The pigments which may be used advantageously in the present invention can include mineral pigments such as kaolin clays, calcium carbonate, titanium oxide, hydrargillite, talc, and barium sulfate. The compressible coating layer also comprises at least one binder and possibly other ingredients such as dispersing agents or agents that improve water retention properties. In general, the compressible coating layer is applied in an amount of between 1 and 10 $g/m^2$ onto the paper surface, and preferably from 2 to 5 $g/m^2$. In order to increase the flexibility of the paper or cardboard, it can be coated on one of its faces with two layers of coating also containing microspheres. In one advantageous embodiment of this invention, the paper or cardboard comprises either a layer or a sublayer of coating containing microspheres on each of its faces.

This invention also relates to a process for the manufacture of the coated paper or cardboard disclosed herein. According to the process, the paper or cardboard is coated on one or both of its faces with an aqueous composition of synthetic polymers present in the form of hollow microspheres containing a gas that is inert with respect to them, that are expandable with heat, and contain at least one binder, other pigmets, if necessary, and other ingredients such as dispersing agents or agents that improve water retention properties. Then, the coated paper or cardboard is dried at the softening temperature of the hollow microspheres, which is generally between about 80° C. and 120° C. The drying, which lasts several seconds, or longer, if necessary, causes expansion of the microspheres. In an alternate embodiment of the process, an aqueous compound containing microspheres that have already been expanded by a thermal pre-treatment is used.

With either embodiment, a perfectly smooth and homogeneous layer which exhibits a flexibility far superior to that of the standard layer of mineral pigments is obtained. After drying, the coated paper or cardboard is advantageously covered with an outside film, and, subsequently, it can undergo a finishing process such as calendering, brushing or glazing. The coating process may be carried out using, for example, a air knife, a size press, a Champion coating machine, a Massey coating machine or a trailing doctor.

Other characteristics and advantages of this invention are demonstrated by the following examples, which are non-limiting in scope.

EXAMPLES 1 TO 11

Aqueous coating compositions are prepared with various components in the proportions indicated in Table 1. The amounts are expressed per 100 parts by weight of the microspheres plus mineral pigments. The microspheres comprise hollow capsules of either polyvinylidene chloride or a vinylidene chloride and acrylontrile copolymer containing isobutane. Commercial microspheres sold under the name SARAN by the Dow Chemical Company or PVDC microspheres of the Swedish company KEMANORD, for example, are used. The expandable microspheres have an average diameter of 5 μm.

The compositions contain a styrene butadiene latex binder, a thickener such as carboxymethylcellulose, (abbreviated as CMC), a lubricatihg agent such as a stearate, and a dispersant such as a polyacrylate. The dry extract of these aqueous compositions is generally between 10 and 30% by weight.

TABLE I

| Ex. | Micro-spheres (%) | Kaolin | Binder | CMC | Calcium Stearate | Poly-acrylate |
|---|---|---|---|---|---|---|
| 1 | 5 | 95 | 15 | 3 | 0.5 | 0.4 |
| 2 | 10 | 90 | 15 | 3 | 0.5 | 0.4 |
| 3 | 20 | 80 | 15 | 3 | 0.5 | 0.4 |
| 4 | 30 | 70 | 15 | 3 | 0.5 | 0.4 |
| 5 | 40 | 60 | 15 | 3 | 0.5 | 0.4 |
| 6 | 50 | 50 | 15 | 3 | 0.5 | 0.4 |
| 7 | 60 | 40 | 15 | 3 | 0.5 | 0.4 |
| 8 | 70 | 30 | 15 | 3 | 0.5 | 0.4 |
| 9 | 80 | 20 | 15 | 3 | 0.5 | 0.4 |
| 10 | 90 | 10 | 15 | 3 | 0.5 | 0.4 |
| 11 | 100 | 0 | 15 | 3 | 0.5 | 0.4 |

A paper of 150 g/cm$^2$ consisting of two pulp jets; specifically, 100 g of unbleached pulp is coated on the side with bleached pulp by aqueous compositions prepared in advance according to Table 1. The coated paper is subsequently dried at 90° C. by a battery of dryers for approximately 15 seconds. This causes softening of the microspheres, which expand to an average diameter of approximately 25 μm. The coated paper then undergoes a calendering treatment in which it is passed between two rolls of 25 cm in diameter which exert a force of 20 kg per linear cm.

When the microsphere-containing coating layer is covered with an outside film, the calender may be advantageously equipped with a water doctor which evenly distributes an aqueous emulsion of polyethylene in a ratio of for example, 2 g/m$^2$, at the moment of calendering. It is also possible to extrude a film of an organic polymer such as polyethylene which is then applied to the layer containing the microspheres.

The paper is subsequently conditioned at a temperature of 23° C. in an atmosphere of 50% relative humidity.

EXAMPLES 12 TO 14

Coated papers are prepared with conventional aqueous compositions containing only the mineral pigments and other ingredients listed in Table 2.

TABLE II

| Ex | Micro-spheres (%) | Kao-lin | Car-bonate | Bin-der | CMC | Stea-rate | Poly-acrylate |
|---|---|---|---|---|---|---|---|
| 12 | 0 | 100 | 0 | 5 | 3 | 0.5 | 0.4 |
| 13 | 0 | 0 | 100 | 5 | 3 | 0.5 | 0.4 |
| 14 | 0 | 60 | 40 | 5 | 3 | 0.5 | 0.4 |

The coated paper products of Examples 1 to 14 are compared on the basis of their quality for use in photogravure printing. In carrying out the comparison, an apparatus employing principles of the photogravure printing process such as the IGT apparatus of the "Institut Voor Graphische Techniek tno Amsterdam," is used. After excess ink is scraped off an intaglio ink roller, the coated paper is printed under given conditions of pressure: 88 N.cm$^3$ and 176 N.cm$^3$ and speed: 100 cm/S. Three types of engraving are combined on the same roll: a uniform area with conventional half tones, an area shaded to half tones, and lines of dots. The printed papers produced are then examined. While the uniform area printing permits only a qualitative judgment of results that is difficult to express, lines of dots and the shaded area printing products demonstrate the excellent printing qualities of the papers of this invention.

The printing quality of papers exposed to the lines of dots engraving is determined by the number of missing dots; the fewer dots missing, the better the printing. The results are as follows:

| Example | Number of Dots Missing |
|---|---|
| 1-11 | 0 |
| 12 | 6 |
| 13 | 11 |
| 14 | 12 |

As the results recorded indicate, when coated papers are prepared according to this invention, the printed product is of a higher quality than those products obtained using conventional coated papers.

The printing quality of papers undergoing shaded area printing is determined by the distance between the beginning of the printing, starting with the full tone, and the first unprinted half tone dot; the greater the distance the greater the uniformity of the printing. The results are as follows:

| Example | Distance (mm) |
|---|---|
| 1-11 | There is never an unprinted half tone dot on these papers |
| 12 | 24 |
| 13 | 45 |
| 14 | 35 |

Again, the results obtained with the coated papers of his invention surpass those demonstrated by conventional coated papers.

We claim:

1. A paper or cardboard having a cellulose fiber base covered with at least one compressible coating layer comprising more than about 1 percent by weight of hollow microspheres filled with a gas that is inert with respect to the microsphere-forming material and at least one pigment of less than about 99 percent by weight of the coating.

2. The paper or cardboard according to claim 1 wherein the microspheres constitute more than about 25 percent by weight of the coating and the pigment comprises less than about 75 percent by weight of the coating.

3. The paper or cardboard according to claim 2 wherein the compressible coating layer further comprises binders or other adjuvants.

4. The paper or cardboard according to claim 3 wherein the compressible coating layer further comprises an external layer.

5. A paper or cardboard having a cellulose fiber base covered with at least one compressible coating layer comprising from between 1 and 100% by weight of hollow microspheres filled with a gas that is inert with respect to the microsphere forming material and from between 99 and 1% by weight of at least one pigment, wherein the compressible coating layer further comprises an outside film to improve the surface properties of the paper or cardboard, such film comprising a layer of mineral pigments, a film of an organic polymer with or without such pigments, or an extruded organic polymer.

6. The paper or cardboard according to claim 5 wherein the compressible coating layer is applied in an amount of between about 1 and 10 g/m$^2$.

7. The paper or cardboard according to claim 6 wherein the compressible coating layer has a thickness of at least 2 $\mu$m.

8. The paper or cardboard according to claim 7 wherein the compressible coating layer further comprises binders or other adjuvants.

9. The paper or cardboard according to claim 8 wherein the microspheres have walls formed by expanded polymers and contain a gas that is inert with respect to the microsphere-forming material.

10. The paper or cardboard according to claim 9 wherein the polymer forming the walls of the microspheres is polyvinylidene chloride, polystyrene, or a copolymer with a vinylidene chloride and acrylonitrile base.

11. The paper or cardboard according to claim 10 wherein the gas is isobutane, a chlorinated or chlorofluorinated hydrocarbon, or carbon dioxide gas.

12. A paper or cardboard having a cellulose fiber base covered with at least one compressible coating layer comprising from between 1 and 100% by weight of hollow microspheres filled with a gas that is inert with respect to the microsphere forming material and from between 99 and 1% by weight of at least one pigment, wherein the compressible coating layer further comprises an outside film to improve the surface properties of the paper or cardboard, such film comprising a layer of mineral pigments, a film of an organic polymer with or without such pigments, or an extruded organic polymer, and wherein the compressible coating layer is applied in an amount of about 2 and 5 g/m$^2$.

13. The paper or cardboard according to claim 12 wherein the compressible coating layer has a thickness of at least 2 $\mu$m.

14. The paper or cardboard according to claim 13 wherein the compressible coating layer further comprises binders or other adjuvants.

15. The paper or cardboard according to claim 14 wherein the microspheres have walls formed by expanded polymers and contain a gas that is inert with respect to the microsphere-forming material.

16. The paper or cardboard according to claim 15 wherein the polymer forming the walls of the microspheres is polyvinylidene chloride, polystyrene, or a copolymer with a vinylidene chloride and acrylonitrile base.

17. The paper or cardboard according to claim 16 wherein the gas is isobutane, a chlorinated or chlorofluorinated hydrocarbon, or carbon dioxide gas.

* * * * *